J. V. MARTIN.
AIRCRAFT RUNNING AND ALIGHTING DEVICE.
APPLICATION FILED JUNE 8, 1916. RENEWED OCT. 3, 1917.

1,306,768.

Patented June 17, 1919.

Inventor
James V. Martin,

Witness
Attorney

J. V. MARTIN.
AIRCRAFT RUNNING AND ALIGHTING DEVICE.
APPLICATION FILED JUNE 8, 1916. RENEWED OCT. 3, 1917.

1,306,768.

Patented June 17, 1919.
3 SHEETS—SHEET 2.

Witness
Chas. W. Stauffiger
J. E. McGinn

Inventor
James V. Martin,
By
Attorneys

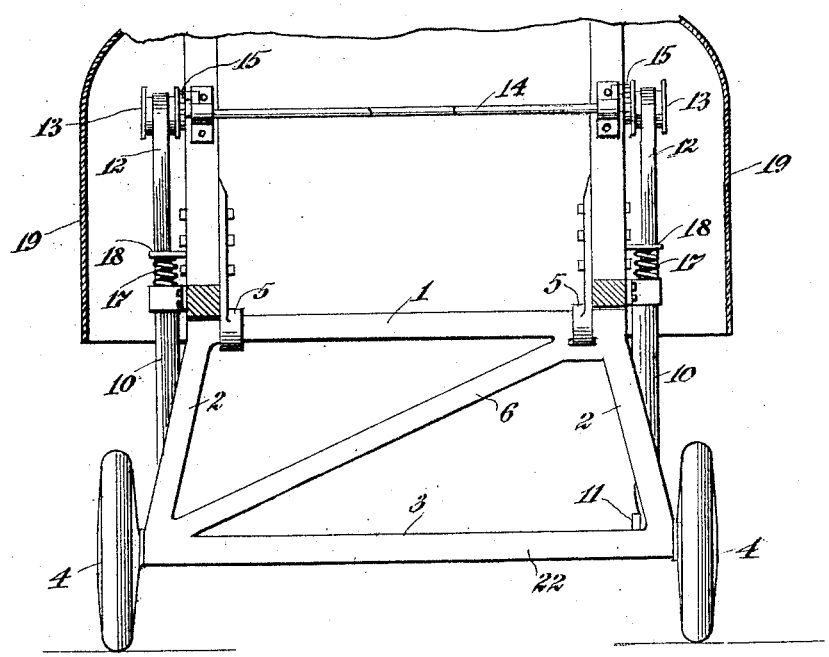

UNITED STATES PATENT OFFICE.

JAMES V. MARTIN, OF DETROIT, MICHIGAN.

AIRCRAFT RUNNING AND ALIGHTING DEVICE.

1,306,768. Specification of Letters Patent. Patented June 17, 1919.

Application filed June 8, 1916, Serial No. 102,576. Renewed October 3, 1917. Serial No. 194,595.

*To all whom it may concern:*

Be it known that I, JAMES V. MARTIN, a citizen of the United States of America, residing at Detroit, in the county of Wayne and State of Michigan, have invented certain new and useful Improvements in Aircraft Running and Alighting Devices, of which the following is a specification, reference being had therein to the accompanying drawings.

This invention relates to an air craft running and alighting device and to an arrangement of the same whereby the head resistance of an aeroplane is reduced materially while the aeroplane is in flight. The invention also includes the provision for a very rigid running and alighting device that presents novel means for absorbing the running jars and alighting shocks. It also includes a construction that in itself reduces the wind resistance to the chassis because of the simplified construction. The construction also provides means for completely housing the device when the machine is in flight, and when extended of closing the housings in such a manner as to present minimum wind resistance and not disturb the passage of air along the stream line of the fuselage when the recesses are not occupied by the alighting device.

The invention consists in the matters hereinafter set forth, and more particularly pointed out in the appended claims.

In the drawings,

Fig. 6 is a view in detail showing a modification of the device whereby the wheels of the chassis are enveloped and housed when the device is retracted.

Figure 1:
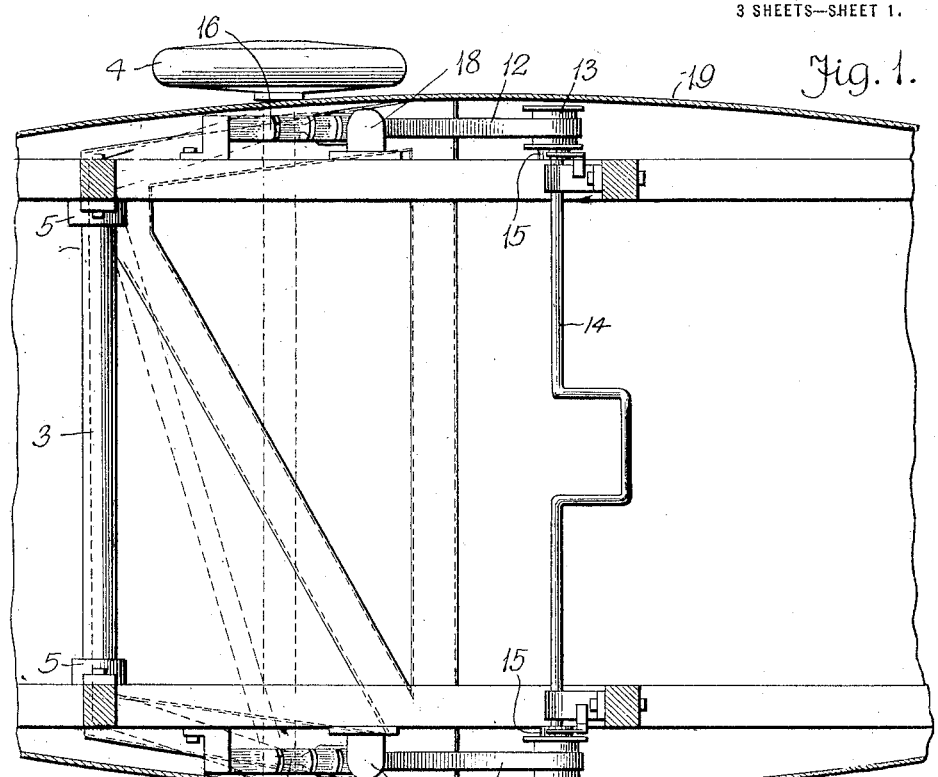
Figure 1 is a view, partly in plan and partly broken away and in section, of the fuselage and accompanying parts of an aeroplane equipped with an alighting device that embodies features of the invention, shown in extended position.

As herein shown, a swinging frame is formed having a journal member 1 rigidly associated with end members 2 and outer members 3 to carry wheels 4 of any approved type. Bearing brackets 5 connected appropriately to the struts and longerons of the fuselage framework pivotally support the member 1, rigidity to the chassis frame as a whole being given by a single diagonal brace 6 which may be proportioned as shown the parts 2, 3 and 6 of the chassis frame preferably having the cross sectional contour indicated in Fig. 4 as the housed portion 8. The bearings 5 are so situated that the member 1 is at all times above the plane of the lower skin or sheathing 9 of the fuselage, and consequently is entirely out of the path of the air current.

Struts 10 are each journaled or pivoted, as at 11, to the frame members 2, adjacent the wheel bearings and are held in upright position when the chassis is retracted, by flexible connections 12 passing over suitable drums 13 on a crank shaft 14 operable from the fuselage, a ratchet mechanism 15 or the like holding the same at any point desired. When the device is lowered, the upper end portions of the struts 10 are snapped under appropriately disposed spring members 16 herein shown of the leaf type, further shock absorbing means being had if desired in the form of upright spiral springs 17 in compression between the leaf spring 16 and a bracket member 18. The release of the ratchet mechanism 15 permits the momentary lowering of the struts 10 until they are clear of and fall to rearward of the latches, both because of gravity and because of the action of the wind in causing them to swing back.

Figure 2:
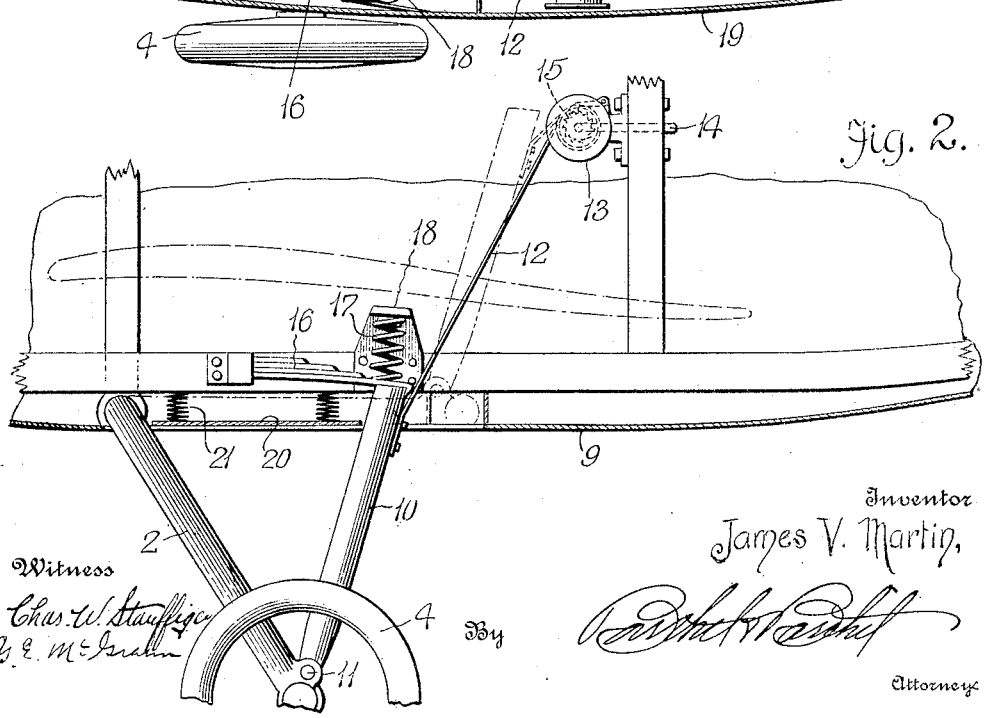
Fig. 2, is a view, partially in side elevation and partially broken away and in section, showing the device in extended position with the retracted position indicated by dotted lines.
Figure 3:
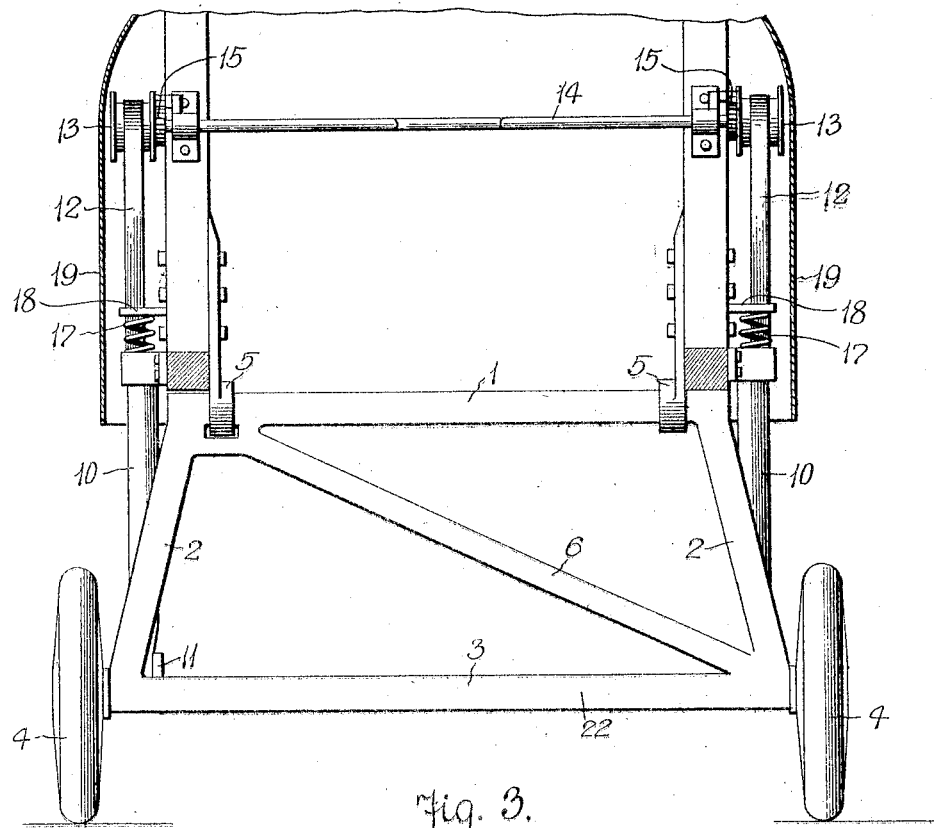
Fig. 3 is a view, partially in elevation and partially in section of the fuselage and device.
Figure 4:
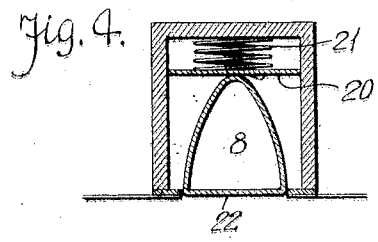
Fig. 4 is a view in detail showing the method of housing a member of the device.
Figure 5:
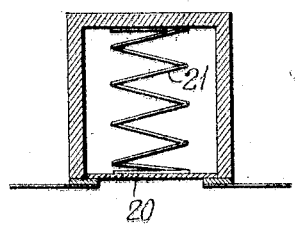
Fig. 5 is a view in detail showing the method of minimizing wind resistance across the mouth of a holding recess when the device is extended.

The flexible connections 12 with their accompanying drums and springs, are housed or concealed within the space between the fuselage frame and side sheathing 19 of the fuselage, which is spaced therefrom and curved to give the desired streamline contour. The bottom wall 9 of the sheathing is provided with a longitudinal slot or opening at each side of the fuselage frame, as indicated in dotted lines at A, A in Fig. 1, to receive the members 2 and permit the members 10 to pass upwardly inside the sheathing when the chassis is folded or retracted, and likewise said bottom sheathing has a transverse opening and a diagonal opening covered by channel members *b* and *c* forming recesses or chambers to receive the chassis frame members 3 and 6, respectively. A filler plate 20 or closure is provided for each opening in the sheathing and each plate is normally projected by springs 21 when the pocket is empty to afford a substantially flush continuation of the skin or sheathing 9 across the pocket mouth, the filler being pressed back into the recess as shown in Fig. 4 when the chassis frame is drawn up as indicated in dotted lines in Fig. 2. Furthermore the cross sectional shape of the members 2, 3, and 6, of the chassis frame, as clearly indicated in Fig. 4, is such that the lower surface 22 thereof is substantially flat and likewise forms a substantially flush continuance of the surface 9 when the chassis is retracted, so that the wind resistance is thereby minimized. As a further detail of construction and as clearly shown in Fig. 6, the exterior sheathing 19 may be so positioned as to envelop the wheels 4 when the device is retracted, while at the same time the lower rim of the wheel is in place where it can act as a support.

As a result of this construction, an alighting device is had that is completely concealed with the exception of the bearing wheels 4 within the fuselage when the machine is in flight and that when extended offers minimum wind resistance because of the single bracing member and the cross sectional contour of the parts while the springs are positioned to minimize the stresses encountered by the device when the machine encounters the ground. All the weight of the machine is communicated almost directly to the wheel through the vertical struts without appreciable effect on the frame that the wheels are mounted on, so that the latter cannot tend to materially distort the frame and the same can therefore be made extremely light.

Obviously, changes in the details of construction may be made without departing from the spirit of my invention and I do not care to limit myself to any particular form or arrangement of parts.

What I claim is:—

1. In an aeroplane, the combination of a chassis housing having an opening, a chassis adapted to be moved into the housing through said opening, means for moving the chassis, and a closure for the opening lying wholly within the housing.

2. In an aeroplane, the combination of a chassis housing having an opening, a chassis adapted to be moved into the housing through said opening, means for moving the chassis, and a closure housed by the housing with the outer surface of the closure lying inwardly of the plane of the outer surface of the housing.

3. In an aeroplane, the combination of a chassis and a housing for the chassis having an opening to receive the chassis, said opening being closed by the housing of the chassis within said housing.

4. In an aeroplane, means for reducing the head resistance of the chassis when the machine is in flight comprising means for housing the chassis when retracted, means for retracting the chassis and means for closing the apertures in which said chassis is housed when the chassis is in extended position.

5. In an aeroplane, a chassis, a swinging frame, an axle rigid therewith, a journal member forming a pivot connection with the chassis, a single diagonal for tensile and concussion shearing stress of the chassis frame and shock absorbing means supporting the main portion of the aeroplane on the chassis frame.

6. In an aeroplane, a recessed housing, a chassis, means for moving the chassis into the housing while the machine is in the air, and means for covering the recesses when the chassis is withdrawn therefrom.

7. In an aeroplane, a recessed housing, a chassis, shock absorbing means for supporting the machine on the chassis, means for moving the chassis from the shock absorbing means into the housing while the machine is in flight, and means for closing the recesses when the chassis is not housed.

8. In an aeroplane, a chassis, a journal rigid therewith pivoted to the main part of the machine, means for moving the chassis on the pivot support relative to the wind resistance while the aeroplane is in flight, recesses provided for housing the chassis when not in use, means for closing the recesses to air when not housing the chassis, and shock absorbing attachments for connecting the chassis to the central portion of the aeroplane when the chassis is in alighting position.

9. In an aeroplane, a chassis frame pivoted to swing on an axis transverse to the line of flight and provided with a rigid axle, wheels journaled on the axle, braces pivoted to the axle, yielding supports on the frame adapted to detachably engage the upper end portions of the braces and cushion the latter against alighting shocks, means within the manual control of the operator for releasing the braces from the cushioning members and retracting the frame and wheels, and means for housing the frame when retracted that provide an unbroken exterior to the plane when the frame is housed.

10. In an aeroplane having a fuselage framework comprising longerons and struts, a sheathing spaced from the fuselage framework, a retractable chassis adapted to be housed within the space between said framework and sheathing, and automatically operating means for closing said space.

11. In an aeroplane, a retractable chassis, and a fuselage having a sheathing provided with an opening into which the chassis is adapted to be retracted, said chassis being formed to close said opening when in retracted position and form with said sheathing a substantially continuous outer fuselage surface.

12. In an aeroplane, a retractable chassis frame and a fuselage having sheathing formed with openings to receive the several members of the said frame, said frame members being adapted to fit within and close said opening when the chassis frame is in retracted position.

13. In an aeroplane, a retractable chassis having frame members and a fuselage having a sheathing provided with openings into which the several frame members are adapted to fit in retracted position of the chassis, said frame members having sides to close said openings and form with said sheathing a substantially flush continuous outer surface.

14. In an aeroplane, a retractable chassis having a swinging frame and wheels thereon, a fuselage having an outer sheathing formed with a pocket at each side to receive the wheels and slots corresponding in width to the width of the members of the frame, whereby said chassis frame may be swung into said slots to be housed by said sheathing and to close the slots.

15. In an aeroplane, a fuselage having a sheathing, a chassis frame pivotally attached to the fuselage above the plane of the lower side of the sheathing, said sheathing being formed with openings to receive the frame, and means for swinging said chassis frame upon its pivots through said openings with the lower surface of the frame substantially in the plane of the sheathing to close the openings and form a continuation of the sheathing surface.

16. In an aeroplane, a fuselage, a rigid chassis frame having wheels journaled thereon, means for moving the chassis frame into the fuselage with the lower portions of said wheels projecting below said fuselage to function as alighting members when held by said means in such retracted position.

17. In an aeroplane, a retractable chassis, a fuselage having a sheathing open to receive said chassis, and means for closing said sheathing operated by a movement of said chassis.

18. In an aeroplane, a retractable chassis, a fuselage sheathing formed to receive said chassis, and automatically operating means for closing said sheathing.

19. In an aeroplane, a fuselage having an external sheathing provided with an opening, a chassis retractable through said opening, and means for automatically closing said opening operable simultaneously with the projection and retraction of said chassis.

In testimony whereof I affix my signature in the presence of two witnesses.

JAMES V. MARTIN.

Witnesses:—
C. R. STICKNEY,
A. M. DORR.

Copies of this patent may be obtained for five cents each, by addressing the "Commissioner of Patents, Washington, D. C."